3,585,033

DIAZOTYPE COMPOSITION EMPLOYING 3'-SUBSTITUTED 2-HYDROXY-3-NAPHTHANILIDES AS COUPLERS

Robert C. Desjarlais, South Hadley Falls, Mass., assignor to The Tecnifax Corporation, Holyoke, Mass.

No Drawing. Filed Sept. 13, 1967, Ser. No. 667,372
Int. Cl. G03c *1/54*
U.S. Cl. 96—75 35 Claims

ABSTRACT OF THE DISCLOSURE 2-hydroxy-3-naphthanilides which are substituted in the 3' position with a non-chromophoric and electron-withdrawing substituent which is attached to the anilino nucleus through the carbon atom of a carbonyl group or the sulfur atom of a sulfonyl group are disclosed. The use of these compounds as color-forming or coupling components for diazonium compounds and light-sensitive diazo compositions containing such naphthanilides as coupling components are also disclosed.

BACKGROUND OF THE INVENTION

Field of the invention

This invention relates to 3'-substituted - 2 - hydroxy-3-naphthanilides wherein the substituent in the 3' position is a non-chromophoric and electron-withdrawing group which is attached to the anilino nucleus through the carbon atom of a carbonyl group or the sulfur atom of a sulonyl group as novel compositions of matter. This invention also relates to the use of these novel naphthanilides as coupling components for diazonium compounds, particularly light-sensitive diazonium compounds; and to light-sensitive diazotype materials wherein at least one light-sensitive diazonium compound and at least one of the novel coupling components of this invention are employed.

Description of the prior art

The coupling reaction of diazonium compounds with compounds such as phenols and amines to form azo dyes has long been known; and this coupling reaction has proven to be most useful in preparing azo dyes, which in turn are useful in preparing textile dyestuffs, and in diazotype imaging systems. In a diazotype imaging process, the azo dye image is produced as a result of a coupling reaction between the color-forming component or coupler and a diazonium compound.

The usual types of diazotype imaging processes employ a diazotype material which comprises a light-sensitive diazonium compound coated on a base or support material. Depending on whether or not the diazotype material is designed for use in a one-component or semi-wet development process, or a two-component or dry process, the layer or coating containing the light-sensitive diazonium compound may or may not also contain a coupling component for said diazonium compound. In the case wherein the diazonium compound is present on the base material without the coupling component (i.e., a one-component or semi-wet development diazotype material), the light-sensitive diazotype material is exposed, and is then developed by applying a developing solution containing a coupling component to the exposed diazotype material. During the exposure step, the light-sensitive diazonium compound is destroyed or altered by light in the exposed areas, thereby making it unavailable for coupling with the coupling component in the development step. The subsequent treatment of the exposed diazotype material with the developing solution containing the coupling component results in the formation of an azo dye image in those areas wherein the unaltered diazonium compound is still available for coupling with the coupling component.

In the case wherein the diazonium compound is present on the base material along with a coupling component (i.e., a two-component or dry development diazotype material), the light-sensitive diazotype material is exposed, and is then developed by subjecting the exposed diazotype material to an alkaline atmosphere. As in the case with the one-component diazotype process, the light-sensitive diazonium compound is destroyed or altered by light in the exposed areas during the exposure step, thereby making it unavailable for coupling with the coupling component. When the exposed diazotype material is then subjected to an alkaline atmosphere (usually a mixture of water vapors and ammonia) the alkaline conditions allow the coupling reaction to take place between the coupling component and the unaltered diazonium compound to form the colored azo dye image.

Although the color of the azo dye image which is obtained in any given instance depends primarily on the coupling components and the diazonium compounds which are employed, coupling components are often generally described as being couplers of a given color, since this is the color of the dye which is usually obtained when the coupling component couples with a diazonium compound. For example, when compounds such as monohydric phenols, catechol, catechol derivatives, diphenyl derivatives, acetonitriles, cyanacetylamides, acetoacetic acid derivatives, alkylmalonamates, diketones and the like are employed as coupling components, the resulting dyes are usually yellow, orange, sepia, brown or red. Hence, these classes of coupling components are usually referred to, for the sake of convenience, as yellow, orange, sepia, brown or red couplers, depending on the color which is generally obtained with any given class of compounds. Similarly, when compounds such as naphthoic acid derivatives, dioxynaphthalene derivatives, pyronones, hydroxypyronones, and the like are employed as coupling components, the color of the dyes which are obtained upon coupling with a diazonium compound generally ranges from blue to violet. Hence these classes of compounds are generally referred to as "blue" couplers.

It should be apparent from the above, that, in addition to obtaining a single-color azo dye image, one should be able to obtain a mixture of azo dyes (and thus a mixture of colors) by including more than one coupling component or more than one diazonium compound in the light-sensitive diazo composition. Thus, by a proper choice of coupling components and/or diazonium compounds, one should be able to obtain a wide variety of colors in the resulting azo dyes, including black. However, the achievement of a uniform color over a wide range of image densities from a diazo composition containing more than one coupling component has proven difficult to obtain in actual practice. In order to obtain a uniform color over a wide range of image densities, it is essential that the coupling activity of the various coupling components with diazonium compound or compounds which are employed be carefully matched, and that the combined absorptions of the azo dyes produced from the various couplers cover the entire visible spectrum. It is also essential that none of the azo dyes produced from the various coupling components be subject to a "color-shift" or change of shade due to a change in pH, else the resulting dye image of the diazotype material may shift from the neutral point.

A number of amide derivatives of 2-hydroxy-3-naphthoic acid have provided several very useful classes of blue coupling compounds for diazo compositions, and some of these classes of 2-hydroxy-3-naphthamide derivatives have been used in combination with a yellow coupler or couplers to prepare black diazo-type images. For example, U.S. Pat. 3,064,049 discloses a class of tri-hydroxy-naphthanilides, which are allegedly suitable for preparing neutral black diazotype images over a wide range of image densities. Although tri-hydroxy-naphthanilides of the type disclosed in U.S. Pat. 3,064,049 are capable of producing neutral black shades, these couplers have been found to have a tendency in certain continuous-tone formulations to produce a "two-toning" effect, particularly in diazotype prints having a wide range of image density values. The high image density areas tend to exhibit blue-black shades, while the low density areas tend to exhibit green-black shades. It is believed that most of the variation in shade which is observed with diazo compositions containing these types of blue couplers is due to a difference in the coupling rates of the blue and yellow coupling compounds.

SUMMARY OF THE INVENTION 2-hydroxy-3-naphthanilides which are substituted in the 3′ position with a non-chromophoric and electron-withdrawing substituent which is attached to the anilino nucleus through the carbon atom of a carbonyl group or the sulfur atom of a sulfonyl group can be prepared by either reacting an acid halide of 2-hydroxy-3-naphthoic acid (e.g. 2-hydroxy-3-naphthoyl chloride) with an aniline which is substituted in the meta-position with a non-chromophoric and electron-withdrawing group attached to the benzene ring through a sulfonyl sulfur or a carbonyl carbon, or by reacting 2-hydroxy-3-naphthoic acid with such a meta-substituted aniline in the presence of an inert solvent and phosphorous trichloride. The resulting 3′-substituted-2-hydroxy - 3 - naphthanilides have been found to be a particularly useful class of blue coupling components for diazonium compounds and the use of these 3′-substituted-2-hydroxy-3-naphthanilides with light-sensitive diazonium compounds in diazo compositions provide a number of useful diazotype materials of various colors, including green, blue and black.

The 3′-substituted-2-hydroxy-3-naphthanilides of this invention have been found to be sufficiently soluble in the solvents which are normally employed in preparing light-sensitive diazo coating compositions to permit the application of such coating compositions containing these naphthanilides as coupling components to a base material; and, since the substituent in the 3′ position is non-chromophoric, diazo compositions containing the naphthanilides of this invention result in diazo-type prints which are essentially colorless in the background areas or clear areas of said prints. If the 3′ substituent were chromophoric, the resulting compounds would be colored; and the use of such compounds as coupling components in a light-sensitive diazo composition would result in undesirable density in the background or clear areas of the final print. These 3′-substituted-2-hydroxy-3-naphthanilides have been found to be particularly useful in preparing light-sensitive diazo compositions which result in a continuous-tone, neutral-black image over a wide image density range, and the azo dyes resulting from these 3′-substituted-2-hydroxy-3-naphthanilides have been found to be relatively insensitive to changes in pH.

DESCRIPTION OF THE PREFERRED EMBODIMENTS

The 3′-substituted-2-hydroxy-3-naphthanilides of this invention are compounds having the general formula:

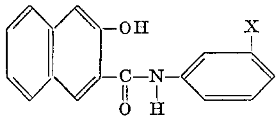

wherein X is a non-chromophoric, electron-withdrawing substituent which is attached to the anilino nucleus through a carbon atom of a carbonyl group or a sulfur atom of a sulfonyl group. Illustrative of the carbonyl-containing groups represented by X (i.e., those groups which are attached to the anilino nucleus through the unit

are groups such as carbalkoxy groups (for example a carbomethoxy group

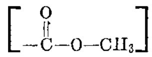

a carbethoxy group

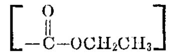

a carbopropoxy group

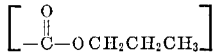

a carbobutoxy group

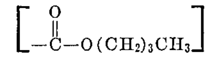

and the like), a carbamyl group

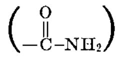

N-substituted carbamyl groups (for example, a methylcarbamyl group

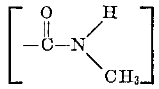

a benzylcarbamyl group

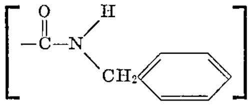

a morpholinocarbamyl group

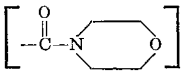

and the like), and acyl groups (for example, an acetyl group

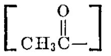

a propionyl group

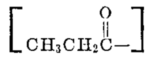

a butyryl group

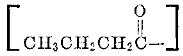

a benzoyl group

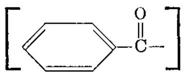

and the like). Illustrative of the sulfonyl-containing groups represented by X (i.e., those groups which are attached to the anilino nucleus though the unit

are groups such as a sulfamyl group (—$SO_2NH_2$), and N-substituted sulfamyl groups (for example, a methylsulfamyl group

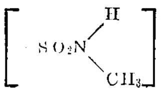

a benzylsulfamyl group

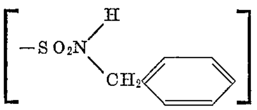

an allylsulfamyl group

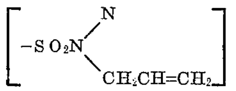

a morpholinopropylsulfamyl group

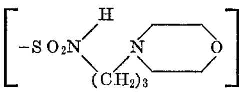

and the like).

Illustrative of the 3'-substituted-2-hydroxy-3-naphthanilides of this invention are compounds such as 2-hydroxy-3-naphthoic acid, 3'-sulfonamidoanilide

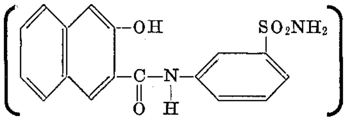

2-hydroxy-3-naphthoic acid, 3'-acetylanilide

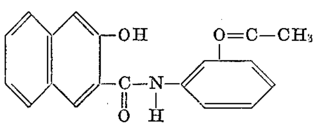

2-hydroxy, 3-naphthoic acid, 3'-(N-allyl) sulfonamidoanilide

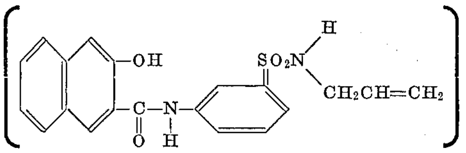

2-hydroxy, 3-naphthoic acid, 3'-(N-benzyl) sulfonamidoanilide

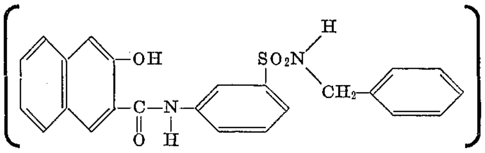

2-hydroxy, 3-naphthoic acid, 3'-(N-morpoholinopropyl) sulfonamidoanilide

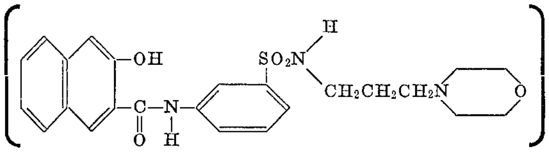

2-hydroxy, 3-naphthoic acid, 3'-(N-methyl) sulfonamidoanilide

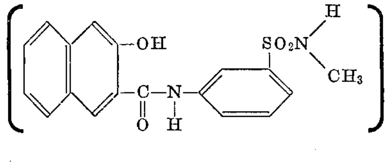

and the like.

As indicated above, the 3'-substituted-2-hydroxy-3-naphthanilides of this invention can be prepared by reacting a meta-substituted aniline having the formula:

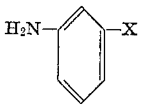

wherein X is as hereinbefore defined with 2-hydroxy-3-naphthoyl chloride, preferably in the presence of a suitable solvent; or by reacting such a meta-substituted aniline with 2-hydroxy-3-naphthoic acid in the presence of an inert solvent and phosphorus trichloride. Illustrative of the meta-substituted anilines which can be employed in preparing the 3'-substituted-2-hydroxy-3-naphthanilides of this invention are compounds such as:

methyl m-aminobenzoate

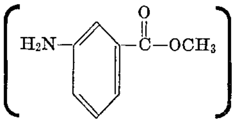

ethyl m-aminobenzoate

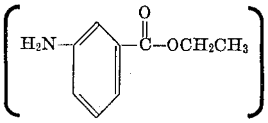

propyl m-aminobenzoate

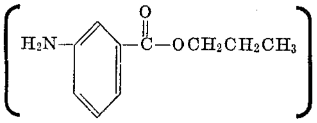

butyl m-aminobenzoate

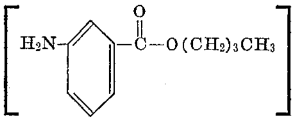

m-aminobenzenesulfonamide

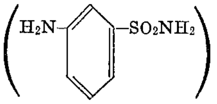

N-methyl-m-aminobenzenesulfonamide

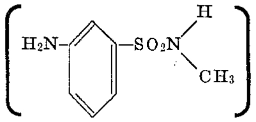

N-benzyl-m-aminobenzenesulfonamide

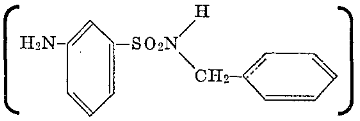

N-allyl-m-aminobenzenesulfonamide

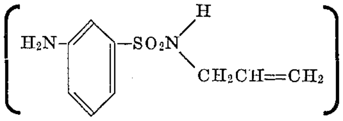

N-morpholinopropyl-m-aminobenzene-sulfonamide

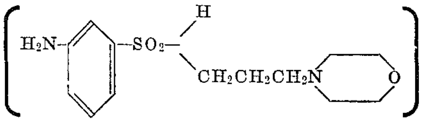

m-aminobenzamide

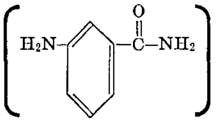

N-methyl-m-aminobenzamide

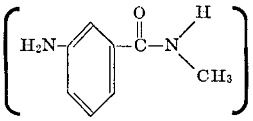

N-benzyl-m-aminobenzamide

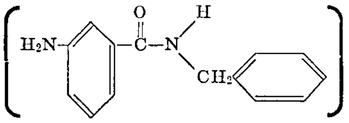

m-aminobenzmorpholide

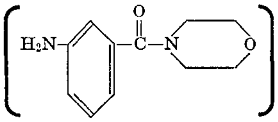

m-aminoacetophenone

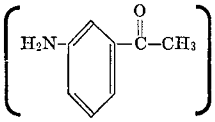

ethyl-m-aminophenyl ketone

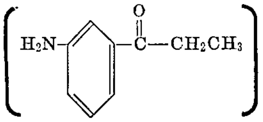

propyl-m-aminophenyl ketone

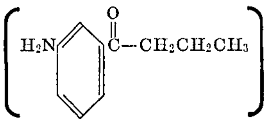

phenyl-m-aminophenyl ketone

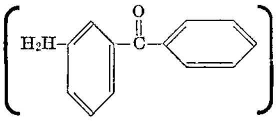

and the like

When the 3′-substituted-2-hydroxy-3-naphthanilides of the present invention are prepared by reacting a meta-substituted aniline with 2-hydroxy-3-naphthoyl chloride, the meta-substituted aniline is first dissolved in a solvent such as toluene, dioxane, methylene chloride, pyridine, and the like, and then 2-hydroxy-3-naphthoyl chloride is added to the aniline solution. The resulting reaction mixture is stirred overnight, and then the desired 3′-substituted-2-hydroxy-3-naphthanilide reaction product is isolated in the usual manner. The reaction between the meta-substituted aniline and 2-hydroxy-3-naphthoyl chloride can be accelerated by refluxing the reaction mixture, and the yield of the desired 3′-substituted-2-hydroxy-3-naphthanilide can be improved by incorporating an acid acceptor in the said reaction mixture. In many instances the solvent used to dissolve the meta-substituted aniline reactant can also serve as an acid acceptor (e.g., solvents such as pyridine, picoline, triethylamine, and the like), or the m-substituted aniline can itself serve as an acid acceptor, if it is employed in amounts in excess of the theoretical amount necessary to react with all of the 2-hydroxy-3-naphthoyl chloride present in the reaction mixture.

When the 3′-substituted-2-hydroxy-3-naphthanilides of the present invention are prepared by reacting a meta-substituted aniline with 2-hydroxy-3-naphthoic acid in the presence of an inert solvent and phosphorus trichloride, 2-hydroxy-3-naphthoic acid and the m-substituted aniline are first dissolved or slurried in a relatively inert solvent such as toluene, methylene chloride, dichloroethane, and the like; and then phosphorus trichloride is added at a controlled rate in order to prevent the temperature of the reaction mixture from exceeding about 55° C. Upon completion of the addition of the phosphorus trichloride, the reaction mixture is then refluxed until substantially all of the hydrochloric acid formed from the reaction is driven off. The desired 3′-substituted-2-hydroxy-3-naphthanilide reaction product can be isolated from the reaction mixture by direct filtration if it has precipitated from solution during the course of the reaction; otherwise, it can be isolated by cooling, or by the addition of diluents in which the desired product is known to be insoluble.

As has hereinbefore been indicated, the 3′-substituted-2-hydroxy-3-naphthanilides of this invention are particularly suitable for use as coupling components, either alone or with other couplers for diazonium compounds, especially the light-sensitive diazonium derivatives of p-phenylenediamines which are normally employed in diazotype materials.

Examples of such light-sensitive diazonium compounds are diazonium derivatives of p-phenylenediamines such as N,N-diethyl-p-phenylenediamine;
N,N-dimethyl-p-phenylenediamine;
N,N-depropyl-p-phenylenediamine;
N-ethyl-N-β-hydroxyethyl-p-phenylenediamine;
N-methyl-N-β-hydroxyethyl-p-phenylenediamine;
2,5-diethoxy-4-morpholinoaniline;
2,5-dimethoxy-4-morpholinoaniline;
2,5-dibutoxy-4-morpholinoaniline;
2,5-diisopropoxy-4-morpholinoaniline;
2,5-di-(t-butoxy-4-morpholinoaniline;
2,5-di-(sec-butoxy)-4-morpholinoaniline;
2,5-di-cyclopentoxy-4-morpholinoaniline;
2,5-diethoxy-4-piperidinoaniline;
2,5-dimethoxy-4-piperidinoaniline;
2,5-dibutoxy-4-piperidinoaniline;

and the like. As is customary in the art, it is preferred to use these diazonium compounds in the form of stabilized diazo salts. It should be understood that these diazonium compounds can be employed either alone, as the single diazonium component in a light-sensitive diazo composition; or in mixture, to provide a light-sensitive diazo composition which contains more than one light-sensitive diazonium component.

It should also be understood that other coupling components can be employed with the 3′-substituted-2-hydroxy-3-naphthanilides of this invention in light-sensitive diazo compositions which are useful in preparing diazotype materials. Light-sensitive diazo compositions containing a mixture of the 3′-substituted-2-hydroxy-3-naphthanilides of this invention with one or more yellow couplers have been found to be particularly suitable for preparing neutral black diazotype images over a wide image density range, and light-sensitive diazo-compositions containing these 3′-substituted-2-hydroxy-3-naphthanilides exhibit excellent stabilities, both in solution and in the form of a coating on a base material or support.

The support or base material used in conjunction with the light-sensitive diazo compositions of this invention may be any of the well-known support materials usually employed with diazo compositions, such as paper, cloth, transparentized paper, cellulose ether films, cellulose ester films, polyester films, and the like. The diazo composition is usually applied in the form of a solution of the various components in a solvent or solvents, which is dried to form a coated support material which can then be imaged and developed in a manner which is well-known in the diazotype art.

In addition to the light-sensitive diazonium compounds and coupling components, the light-sensitive diazo compositions of this invention can also contain any of the additional components which are employed in such compositions, such as stabilizers, preservatives, extenders, color intensifiers, light-sensitive intensifiers, anti-oxidants, inhibitors, and the like.

Light-sensitive diazo compositions comprising the 3'-substituted-2-hydroxy-3-naphthanilides of the present invention, a particular class of light-sensitive diazonium compounds, and a particular class of background discoloration inhibitors are disclosed and claimed in a copending application U.S. Ser. No. 667,365 filed on even date as the present application. Compositions comprising the 3'-substituted-2-hydroxy-3-naphthanilides of the present invention, a particular class of light-sensitive diazonium compounds, a particular class of yellow couplers, and a particular class of background discoloration inhibitors are also disclosed and claimed therein, as well as diazotype materials prepared from these compositions. It is intended that the disclosure of this copending application be incorporated in the present application by way of reference thereto.

The diazotype materials prepared from the light-sensitive diazo compositions of this invention find use in the fields of engineering, drawing reproduction, microfilm, visual communications and the graphic arts.

The following examples will serve to further illustrate this invention, but they are not intended to limit the scope thereof in any way.

EXAMPLE 1.—PREPARATION OF 2-HYDROX-3-NAPHTHOIC ACID, 3'-SULFONAMIDOANILIDE 17.2 grams of m-aminobenzenesulfonamide

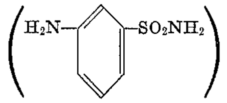

were dissolved in 100 ml. of dry pyridine and 20.6 grams of 2-hydroxy-3-naphthoyl chloride

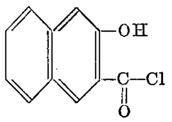

which was prepared by refluxing 2-hydroxy-3-naphthoic acid and thionyl chloride in methylene chloride were then added to the aminobenzenesulfonamide-pyridine solution. Upon completion of the addition of naphthoyl chloride to the aminobenzenesulfonamide-pyridine solution, the resulting reaction mixture was refluxed for two hours at 118° C. The reaction mixture was then cooled to room temperature and 500 ml. of water were added, at which time a cream colored solid precipitated from the reaction mixture. After filtering, the solids were washed with water, slurried in isopropanol, and then re-filtered. The yield was 21.5 grams of a white solid having a melting point of 276° to 280° C. Carbon-hydrogen-nitrogen analysis of the product was as follows:

Found (percent): Hydrogen, 4.23; nitrogen, 7.64; carbon, 62.21. Theoretical (percent): Hydrogen, 4.10; nitrogen, 8.20; carbon, 59.60.

Infrared analysis was as follows:

Strong amide absorption bands at 6.0 and 6.5 microns.

Strong sulfonamide absorption bands at 6.98, 7.55 and 8.67 microns.

Medium —$NH_2$ and >N—H absorption bands at 3.0 microns.

Weak —$NH_2$ absorption band at 3.1 microns.

The 2-hydroxy-3-naphthoic acid, 3'-sulfonamidoanilide product which was obtained had the following structure:

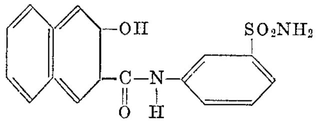

EXAMPLE 2.—PREPARATION OF 2-HYDROXY-3-NAPHTHOIC ACID, 3'-ACETYLANILIDE 42.5 grams of m-aminoacetophenone

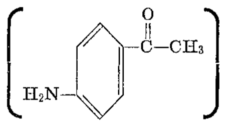

where dissolved in 600 ml. of dry pyridine, and 20.6 grams of 2-hydroxy-2-naphthoyl chloride were then added slowly to the aminoacetophenone-pyridine solution. Upon completion of the addition of the 2-hydroxy-3-naphthoyl chloride to the aminocetophenone-pyridine solution, the resulting reaction mixture was refluxed for seventeen hours. The reaction mixture was cooled and then poured slowly into 1 liter of water, at which time a solid precipitate formed and was collected by filtration. The precipitate was dissolved in ethanol at 65° to 70° C., and clarified with activated charcoal. After separating the activated charcoal, water was added slowly to the ethanol solution until the purified reaction product re-precipitated from the solution. The reaction product was then filtered from this solution and was air-dried overnight to yield 47 grams of a pale yellow solid which melted at 195° to 196° C. Carbon-hydrogen-nitrogen analysis of the product was as follows:

Found (percent): Carbon, 74.97; hydrogen, 5.08; nitrogen, 4.44. Theoretical (percent): Carbon, 74.90; hydrogen, 4.91; nitrogen, 4.59.

Infrared analysis was as follows:

Medium >N—H or —OH absorption bands at 3.0 microns.

Very strong amide absorption bands at 6.0 and 6.45 microns.

Strong acetyl absorption band at 7.35 microns.

The 2-hydroxy-3-naphthoic acid, 3'-acetylanilide product which was obtained had the following structure:

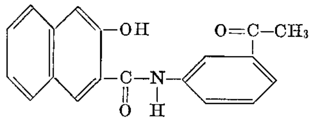

EXAMPLE 3.—PREPARATION OF 2-HYDROXY-3-NAPHTHOIC ACID, 3'-(N-ALLYL)SULFONAMIDOANILIDE 21 grams of N-allyl-m-aminobenzenesulfonamide

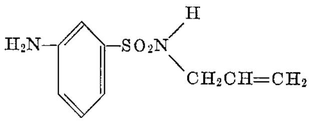

were dissolved in 100 ml. of dry pyridine, and 20.6 grams of 2-hydroxy-3-naphthoyl chloride were then added slowly to the N-allyl-m-aminobenzenesulfonamide-pyridine solution. The temperature was maintained at 40° to 45° C. by regulating the rate of addition of the 2-hydroxy-3-naphthoyl chloride. Upon completion of the addition of the 2-hydroxy-3-naphthoyl chloride, the mixture was refluxed for two hours at 118° C. The reaction mixture was then cooled to 30° C., and 500 ml. of water were slowly added. An amber oil separated from the diluted reaction mixture, and this oil rapidly solidified to form a buff-colored, solid precipitate. The solid precipitate was collected by filtration and purified by recrystallization from a mixture of isopropanol and acetone. Ten grams of a cream colored solid which had a melting point of 196° to 200° C. were recovered. Carbon-hydrogen-nitrogen analysis of the product was as follows:

Found (percent): Carbon, 58.83; hydrogen, 4.77; nitrogen, 8.96. Theoretical (percent): Carbon, 62.90; hydrogen, 4.72; nitrogen, 7.39.

Infrared analysis was as follows:

Weak >N—H absorption band at 2.96 microns
Strong >N—H absorption band at 3.05 microns
Strong amide absorption bands at 6.0 microns and 6.5 microns.
Strong sulfonamide absorption bands at 6.98 microns, 7.6 microns and 8.65 microns.

The 2-hydroxy-3-naphthoic acid, 3'-(N-allyl) sulfonamidoanilide product which was obtained had the following structure:

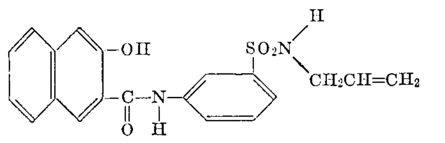

EXAMPLE 4.—PREPARATION OF 2-HYDROXY-3-NAPHTHOIC ACID, 3'-(N-BENZYL) SULFONAMIDOANILIDE 39.5 grams of N-benzyl-m-aminobenzenesulfonamide

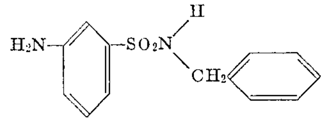

were dissolved in 125 ml. of dry pyridine, and 30.9 grams of 2-hydroxy-3-naphthoyl chloride were then added slowly to the N-benzyl-m-aminobenzene - sulfonamide - pyridine solution. Upon completion of the addition of the 2-hydroxy-3-naphthoyl chloride, the mixture was refluxed for two hours at 120° C. The reaction mixture was then cooled to room temperature, and 500 ml. of water were slowly added, at which time a solid precipitate formed and was collected by filtration. After washing with water, the precipitate was further purified by recrystallization from a mixture of isopropanol and acetone to yield 22 grams of a peach-colored solid having a melting point of 230° to 233° C. Carbon hydrogen-nitrogen analysis of the product was as follows:

Found (percent): Carbon, 66.70; hydrogen, 4.63; nitrogen, 6.91. Theoretical (percent): Carbon, 66.40; hydrogen, 4.62; nitrogen, 6.45.

Infrared analysis was as follows:

Weak —OH absorption band at 2.92 microns
Medium >N—H absorption band at 3.06 microns
Medium amide absorption band at 5.97 microns
Strong sulfonamide absorption bands at 7.6 microns and 8.6 microns.

The 2-hydroxy-3-naphthoic acid, 3'-(N-benzyl) sulfonamidoanilide product which was obtained had the following structure:

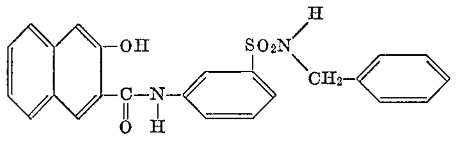

EXAMPLE 5.—PREPARATION OF 2-HYDROXY-3-NAPHTHOIC ACID, 3'-(N-MORPHOLINOPROPYL) SULFONAMIDOANILIDE 17 grams of N-morpholinopropyl-m-aminobenzene- sulfonamide

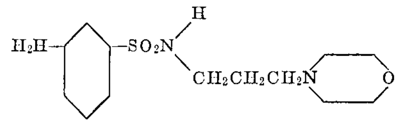

were dissolved in 100 ml. of dry pyridine, and 10.3 grams of 2-hydroxy-naphthoyl chloride were then added slowly to the N-morpholinopropyl-m-aminobenzenesulfonamide-pyridine solution. The temperature was maintained at 40° to 45° C. by regulating the rate of addition of the 2-hydroxy-3-naphthoyl chloride. Upon completion of the addition of the 2-hydroxy-3-naphthoyl chloride. Upon completion of the addition of the 2-hydroxy-3-naphthoyl chloride, the mixture was refluxed for one and one-half hours at 120° C. The reaction mixture was then cooled to 30° C., and 500 ml. of water were added. An amber oil separated from the diluted reaction mixture, and this oil solidified when it was separated from the diluted reaction mixture by decantation. The oil was then triturated with 100 ml. of isopropanol, and water was added to the triturated with 100 ml. of isopropanol, and water was added to the triturated oil to form a solid precipitate. The solid precipitate was collected by filtration and purified by recrystallization from a mixture of acetone and isopropanol. 17 grams of a cream-white solid having a melting point of 180° to 185° C. were recovered. Carbon-hydrogen-nitrogen analysis of the product was as follows.

Found (percent): Carbon, 64.99; hydrogen, 5.39; nitrogen, 5.53. Theoretical (percent): Carbon, 61.50; hydrogen, 5.75; nitrogen, 8.95.

Infrared analysis was as follows:

Medium >N—H absorption band at 3.2 microns
Weak carbonyl absorption band at 5.75 microns
Strong sulfonyl absorption bands at 7.4 microns and 8.6 microns
Medium >C—O—C< absorption band at 8.03 microns.

The 2-hydroxy-3-naphthoic acid, 2'-(N-morpholinopropyl) sulfonamidoanilide product which was obtained had the following structure:

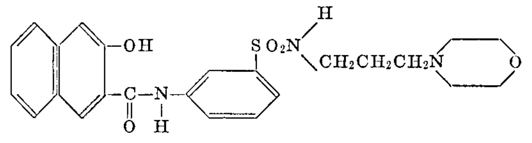

EXAMPLE 6.—PREPARATION OF 2-HYDROXY-3-NAPHTHOIC ACID, 3'-(N-METHYL) SULFONAMIDOANILIDE 28 grams of N-methyl-m-aminobenzenesulfonamide

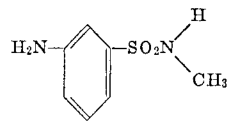

were dissolved in 100 ml. of dry pyridine, and 33 grams of 2-hydroxy-3-naphthoyl chloride were then added slowly to the N-methyl - m - aminobenzenesulfonamide-pyridine solution. The temperature was maintained at 40° to 45° C. by regulating the rate of addition of the 2-hydroxy-3-naphthoyl chloride. Upon completion of the addition of the 2-hydroxy-3-naphthoyl chloride, the mixture was refluxed at 120° C. for 1 hour. The reaction mixture was then cooled to 30° C., and 500 ml. of water were added, at which time a solid precipitate formed and was collected by filtration. After washing with water, the precipitate was further purified by recrystallization from a mixture of ethanol and acetone. The recrystallization was repeated a second time, and 8.5 grams of a cream-colored solid having a melting point of 190° to 205° C. were recovered. Carbon-hydrogen-nitrogen analysis of the product was as follows:

Found (percent): carbon, 56.95; hydrogen, 4.41; nitrogen, 9.85. Theoretical (percent): carbon, 57.00; hydrogen, 5.04; nitrogen, 7.82.

Infrared analysis was as follows:

Strong >N–H absorption band at 3.04 microns.
Medium to strong amide absorption bands at 6.02 microns and 6.50 microns.
Strong sulfonamide absorption bands at 7.53 microns and 8.70 microns.

The 2-hydroxy-3-naphthoic acid, 3′-(N-methyl)sulfonamidoanilide product which was obtained had the following structure:

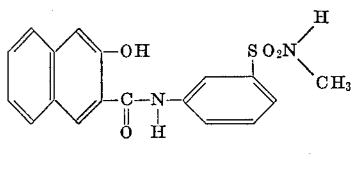

EXAMPLE 7

Light-sensitive coating formulations were prepared containing the following components:

| Component | Formula A | Formula B |
|---|---|---|
| Methanol, cc | 52 | 52 |
| Acetone, cc | 38 | 38 |
| Methyl ethyl ketone, cc | 10 | 10 |
| Sulfosalicyclic acid, g | 1.3 | 1.3 |
| Zinc chloride, g | 0.5 | 0.5 |
| Thiourea, g | 0.5 | 0.5 |
| 2,2′,4,4′-tetrahydroxy-3,3′-dimethyldiphenyl sulfide,[1] g | 0.79 | 0.79 |
| 2-hydroxy-3-naphthoic acid, 2′-methylanilide, g | 8.86 | ---------- |
| 2-hydroxy-3-naphthoicacid, 3′-(N-benzyl)sulfonamidoanilide, g | ---------- | 1.05 |
| 2,5-diisopropoxy-4-morpholinobenzene diazonium chloride, ½ $ZnCl_2$ salt, g | 2.1 | 2.1 |

[1] The 2,2′,4,4′-tetrahydroxy-3,3′-dimethyldiphenyl sulfide coupler was prepared by reacting 2-methyl resourcinol with sulfur dichloride in he presence of ethyl acetate. Its preparation is disclosed in detail in opending application U.S. Serial No. 667,365.

Each of the above formulations were coated onto a clear, cellulose diacetate support and dried. The dried, light-sensitive film was then exposed under a mercury vapor lamp light-source in a diazo duplicating machine through a silver gelatin photographic step tablet having 21 steps, and subsequently developed with ammonia vapor. The diazotype print obtained from the film wherein Formula A was employed as the light-sensitive diazo composition exhibited a green-yellow image in the high image density areas and a blue-black image in the areas of lower image densities. The diazotype print obtained from the film wherein Formula B was employed as the light-sensitive diazo composition exhibited a uniform green-black shade over a wide range of image densities.

EXAMPLE 8

A light-sensitive coating formulation was prepared containing the following components:

| Component | Formnla C | Formnla D |
|---|---|---|
| Methanol, cc | 52 | 52 |
| Acetone, cc | 38 | 38 |
| Methyl ethyl ketone, cc | 10 | 10 |
| Sulfosalicyclic acid, g | 1.3 | 1.3 |
| Zinc chloride | 0.5 | 0.5 |
| Thiourea | 0.5 | 0.5 |
| 2-methyl resorcinol | 2.0 | 2.0 |
| 2-hydroxy-3-naphthoic acid, 2′-methylanilide | 0.6 | ---------- |
| 2-hydroxy-3-naphthoic acid, 2′-methoxyanilide | 0.3 | ---------- |
| 2-hydroxy-3-naphthoic acid, 3′-acetylanilide, g | | 0.96 |
| p-(N,N diethyl) aminobenzenediazonium chloride, ½ $ZnCl_2$ salt, g | 0.9 | 0.9 |
| 2,5-diethoxy-4-morpholinobenzene-diazonium chloride, ½ $ZnCl_2$ salt, g | 0.9 | 0.9 |

Each of the formulations were coated on a commercially available cellulose diacetate film and dried. The dried, light-sensitive films were then exposed and developed in a manner similar to that set forth in Example 7. The diazotype print obtained from the film wherein Formula C was employed as the light-sensitive diazo composition exhibited a greenish-black hue in the high density areas and a blue-gray color in the lower density areas. The diazotype print obtained from the film wherein Formula D was employed as the light-sensitive diazo-composition exhibited a uniform green shade over a wide range of image densities.

EXAMPLE 9

A light-sensitive coating formulation was prepared containing the following components:

| Component: | | Amount |
|---|---|---|
| Methanol | cc | 52 |
| Acetone | cc | 38 |
| Methyl ethyl ketone | cc | 10 |
| Hexafluorophosphoric acid | cc | 0.6 |
| Thiourea | gm | 0.3 |
| 2-hydroxy-3-naphthoic acid, 3′-acetylanilide | gm | .99 |
| 2,2′,4,4′-tetrahydroxy-3,3′-dimethyldiphenyl sulfide | gm | 0.75 |
| 1,2,3-triphenylimidazolidine | gm | 0.75 |
| 4-morpholino-2,5-diisopropoxybenzene diazonium hexafluorophosphate | gm | 2.3 |

This coating formulation was coated onto a clear, cellulose diacetate film base and dried. The dried, light-sensitive film was then exposed under a mercury vapor lamp light-source in a diazo duplicating machine using a silver halide master and developed with ammonia vapor. A neutral black print was obtained from this film over a wide range of image densities, and the resulting print exhibited excellent light-fade resistance and aging characteristics. When the 2,2′,4,4′-tetrahydroxy-3,3′-dimethyldiphenyl sulfide coupler is replaced with either 2,2′,4,4′-tetrahydroxy-3,3′-dimethyldiphenyl sulfoxide [1] or 2,2′,4,4′-tetrahydroxy-3,3′-dimethyl-5,5′-dichlorophenyl sulfide [2] in the above formulation, similar results are obtained, in that an excellent black print from the film is obtained over a wide range of image densities. Similarly, when the 4-morpholino-2,5-diisopropoxybenzene diazonium hexafluorophosphate is replaced with either 4-morpholino-2,5-dicyclopentyloxybenzene diazonium hexafluorophosphate or 4-morpholino-2,5-di(secondary-butoxy) benzene diazonium hexafluorophosphate in the above formulation, the desirable properties are also observed in the prints resulting from films prepared from said formulations. When the 2,2′,4,4′-tetrahydroxy-3,3′-dimethyl diphenyl sulfide coupler in the above formulation is replaced with diresorcyl sulfide, diresorcyl sulfoxide or diresorcinol, the prints resulting from the films prepared these formulations exhibit blue, violet, blue-black prints having reddish violet hues, rather than the neutral blacks which are obtained from formulation containing the 2,2′,4,4′-tetrahydroxy-3,3′-dimethyldiphenyl sulfide coupler.

[1] The 2,2′,4,4′-tetrahydroxy-3,3′-dimethyldiphenyl sulfoxide coupler can be prepared by reacting 2,2′,4,4′-tetrahydroxy-3,3′-dimethyldiphenyl sulfide with hydrogen peroxide in the presence of glacial acetic acid. Its preparation is disclosed in detail in copending application U.S. Ser. No. 667,365.

[2] The 2,2′,4,4′ - tetrahydroxy-3,3′-dimethyl-5,5′-dichlorodiphenyl sulfide coupler can be prepared by reacting 2-methyl-4-chlororesorcinol with sulfur dichloride in the presence of ethyl acetate as a solvent. Its preparation is also disclosed in detail in copending application U.S. Ser. No. 667,365.

EXAMPLE 10

A light-sensitive coating formulation was prepared containing the following components.

| Component: | | Amount |
|---|---|---|
| Methanol | cc | 52 |
| Acetone | cc | 38 |
| Methyl ethyl ketone | cc | 10 |
| Hexafluorophosphoric acid | cc | 0.6 |
| Thiourea | gm | 0.3 |
| 2,2',4,4'-tetrahydroxy-3,3'-dimethyl diphenyl sulfide | gm | 0.56 |
| 2-hydroxy-3-naphthoic acid, 3'-sulfonamidoanilide | gm | 0.89 |
| 2-hydroxy-3-naphthoic acid, 3'-(N-methyl)sulfonamidoanilide | gm | 0.15 |
| 2,2',4,4'-tetrahydroxy-5,5'-dichlorodiphenylsulfide [1] | gm | 0.15 |
| 1,2,3-triphenylimidazolidine | gm | 0.75 |
| 4-morpholino-2,5-diisopropoxybenzene diazonium hexafluorophosphate | gm | 2.3 |

[1] The 2,2',4,4'-tetrahydroxy-5,5'-dichlorodiphenyl sulfide coupler can be prepared by reacting 4-chloro-resorcinol with sulfur dichloride in the presence of ethyl acetate as a solvent. Once again, the preparation of this coupler is also disclosed in detail in copending application U.S. Ser. No. 667,365.

This coating formulation was coated onto a clear cellulose diacetate film base and dried. The dried, light-sensitive film was then exposed in a manner similar to that set forth in Example 9. A neutral black print was obtained from this film over a wide range of image densities, and the resulting print exhibited excellent light-fade resistance and aging characteristics.

EXAMPLE 11

A light-sensitive coating formulation was prepared containing the following components.

| Component: | | Amount |
|---|---|---|
| Methanol | cc | 52 |
| Acetone | cc | 38 |
| Methyl ethyl ketone | cc | 10 |
| Hexafluorophosphoric acid | cc | 0.6 |
| Thiourea | gm | 0.3 |
| 2,2',4,4'-tetrahydroxy-3,3'-dimethyldiphenyl sulfide | gm | 0.75 |
| 2-hydroxy-3-naphthoic acid, 3'-acetylanilide | gm | 0.99 |
| 2,2',4,4'-tetrahydroxy-5,5'-dichlorodiphenyl sulfide | gm | 0.165 |
| 1,2,3-triphenylimidazoline | gm | 0.75 |
| 4-morpholino-2,5-diisopropoxybenzene diazonium hexafluorophosphate | gm | 2.3 |

This coating formulation was coated onto a clear, cellulose diacetate base and dried. The dried, light-sensitive film was then exposed under a mercury vapor lamp light-source in a diazo duplicating machine using a silver halide master and developed with ammonia vapor. A neutral black print over a wide range of image densities was obtained, and the resulting print exhibited excellent light-fade resistance and aging characteristics. When 2-hydroxy-3-naphthoic acid, 3'-(N-allyl) sulfonamidoanilide or 2-hydroxy-3-naphthoic acid, 3'-(N-morpholinopropyl)sulfonamidoanilide are substituted for any of the 3'-substituted-2-hydroxy-3-naphthanilides in the formulations set forth above, similar results are obtained, in that the prints obtained from diazotype materials using these formulations exhibit a uniform shade over a wide range of image densities, and are relatively insensitive to changes in pH.

What is claimed is:

1. A light-sensitive diazo composition which comprises (1) at least one light-sensitive diazonium compound, (2) an azo coupling component of the general formula:

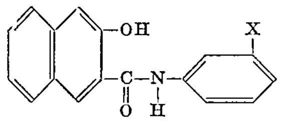

wherein X is a non-chromophoric, electron withdrawing substituent which is attached to the anilino nucleus by the carbon atom of a carbonyl group or the sulfur atom of a sulfonyl group and wherein X is selected from the class consisting of carbalkoxy groups, a carbamyl group, N-substituted carbamyl groups, acyl groups, a sulfamyl group, and N-substituted sulfamyl groups, and (3) an acidic stabilizing compond.

2. A light-sensitive diazo composition as claimed in claim 10 wherein the coupling component has the structural formula:

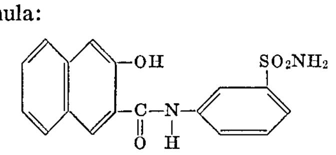

3. A light-sensitive diazo composition as claimed in claim 1 wherein the coupling component has the structural formula:

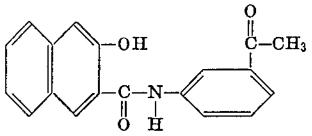

4. A light-sensitive diazo composition as claimed in claim 1 wherein the coupling component has the structural formula:

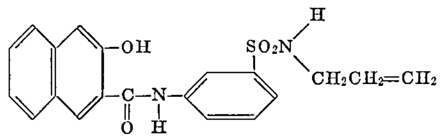

5. A light-sensitive diazo composition as claimed in claim 1 wherein the coupling component has the structural formula:

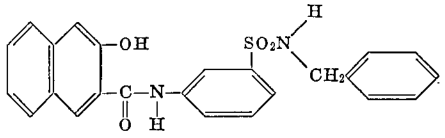

6. A light-sensitive diazo composition as claimed in claim 1 wherein the coupling component has the structural formula:

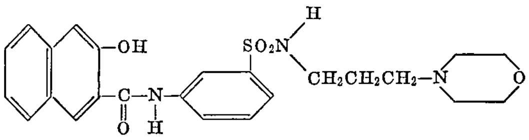

7. A light-sensitive diazo composition as claimed in claim 1 wherein the coupling component has the structural formula:

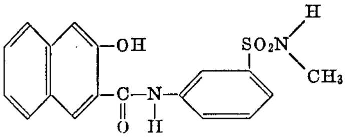

8. A light-sensitive diazo composition as claimed in claim 1 wherein the light-sensitive diazonium compound is at least one diazonium derivative of a p-phenylenediamine selected from the class consisting of
N,N-diethyl-p-phenylenediamine;
N,N-diethyl-p-phenylenediamine;
N,N-dimethyl-p-phenylenediamine;
N,N-dipropyl-p-phenylenediamine;
N-ethyl-N-β-hydroxyethyl-p-phenylenediamine;
N-methyl-N-β-hydroxyethyl-p-phenylenediamine;
2,5-diethoxy-4-morpholinoaniline;
2,5-dimethoxy-4-morpholinoaniline;
2,5-dibutoxy-4-morpholinoaniline;
2,5-diisopropoxy-4-morpholinoaniline;
2,5-di-(t-butoxy)-4-morpholinoaniline;
2,5-di(sec-butoxy)-4-morpholinoaniline;
2,5-dicyclopentoxy-4-morpholinoaniline;
2,5-diethoxy-4-piperidinoaniline;
2,5-dimethoxy-4-piperidinoaniline; and
2,5-dibutoxy-4-piperidinoaniline.

9. A light-sensitive diazo composition as claimed in claim 8 which comprises, as an additional component, at least one other coupling component selected from the group consisting of
2,2′,4,4′-tetrahydroxy-3,3′-dimethyldiphenyl sulfide;
2-methylresorcinol;
2,2′,4,4′-tetrahydroxy-3,3′-dimethyldiphenylsulfoxide;
2,2′,4,4′-tetrahydroxy-3,3′-dimethyl-5,5′-dichlorodiphenylsulfide;
diresorcyl sulfide;
diresorcyl sulfoxide;
diresorcinol; and
2,2′,4,4′-tetrahydroxy-5,5′-dichlorodiphenyl sulfide.

10. A light-sensitive diazo composition as claimed in claim 9 which comprises a diazonium derivative of 2,5-diisopropoxy-4-morpholinoaniline as the light-sensitive diazonium compound; and 2,2′,4,4′-tetrahydroxy-3,3′-dimethyldiphenyl sulfide; and 2-hydroxy-3-naphthoic acid, 3′-(N-benzyl)sulfonamidoanilide as the coupling components.

11. A light-sensitive diazo composition as claimed in claim 9 which comprises a diazonium derivative of N,N-diethyl-p-phenylenediamine and a diazonium derivative of 2,5 diethoxy-4-morpholinoaniline as the light-sensitive diazonium compounds; and 2-methyl resorcinol and 2-hydroxy-3-naphthoic acid, 3′-acetylanilide as the coupling components.

12. A light-sensitive diazo composition as claimed in claim 9 which comprises a diazonium derivative of 2,5-diisopropoxy-4-morpholinoaniline as the light-sensitive diazonium compound; and 2,2′,4,4′-tetrahydroxy-3,3′-dimethyldiphenyl sulfide and 2-hydroxy-3-naphthoic acid, 3′-acetylanilide as the coupling components.

13. A light-sensitive diazo composition as claimed in claim 9 which comprises a diazonium derivative of 2,5-diisopropoxy-4-morpholinoaniline as the light-sensitive diazonium compound; and 2,2′,4,4′-tetrahydroxy-3,3′-dimethyldiphenyl sulfoxide and 2-hydroxy-3-naphthoic acid, 3′-acetylanilide as the coupling components.

14. A light-sensitive diazo composition as claimed in claim 9 which comprises a diazonium derivative of 2,5-diisopropoxy-4-morpholinoaniline as the light-sensitive diazonium compound; and 2,2′,4,4′-tetrahydroxy-3,3′-dimethyl-4,4′-dichlorodiphenyl sulfide and 2-hydroxy-3-naphthoic acid, 3′-acetylanilide as coupling components.

15. A light-sensitive diazo composition as claimed in claim 9 which comprises a diazonium derivative of 2,5-diisopropoxy-4-morpholinoaniline as the light-sensitive diazonium compound; and diresorcyl sulfide and 2-hydroxy-3-naphthoic acid, 3′-acetylanilide as the coupling components.

16. A light-sensitive diazo composition as claimed in claim 9 which comprises a diazonium derivative of 2,5-diisopropoxy-4-morpholinoaniline as the light-sensitive diazonium compound; and diresorcyl sulfoxide and 2-hydroxy-3-naphthoic acid, 3′-acetylanilide as the coupling components.

17. A light-sensitive diazo composition as claimed in claim 9 which comprises a diazonium derivative of 2,5-diisopropoxy-4-morpholinoaniline as the light-sensitive diazonium compound; and diresorcinol and 2-hydroxy-3-naphthoic acid, 3′-acetylanilide as the coupling components.

18. A light-sensitive diazo composition as claimed in claim 9 which comprises a diazonium derivative of 2,5-dicyclopentyloxy - 4 - morpholinoaniline as the light-sensitive diazonium compound; and 2,2′,4,4′-tetrahydroxy-3,3′-dimethyldiphenyl sulfide and 2-hydroxy-3-naphthoic acid, 3′-acetylanilide as the coupling components.

19. A light-sensitive diazo composition as claimed in claim 9 which comprises a diazonium derivative of 2,5-di(secondary-butoxy)-4 - morpholinoaniline as the light-sensitive diazonium compound; and 2,2′,4,4′-tetrahydroxy-3,3′-dimethyldiphenyl sulfide and 2-hydroxy - 3 - naphthoic acid, 3′-acetylanilide as the coupling components.

20. A light-sensitive diazo composition as claimed in claim 9 which comprises a diazonium derivative of 2,5-diisopropoxy - 4 - morpholinoaniline as the light-sensitive diazonium compound; and 2,2′,4,4′ - tetrahydroxy-3,3′-dimethyldiphenyl sulfide; 2,2′,4,4′ - tetrahydroxy - 5,5′-dichlorodiphenyl sulfide; 2-hydroxy - 3 - naphthoic acid, 3′-sulfonamidoaniline; and 2-hydroxy - 3 - naphthoic acid, 3′-(N-methyl)sulfonamidoanilide as the coupling components.

21. A light-sensitive diazo composition as claimed in claim 9 which comprises a diazonium derivative of 2,5-diisopropoxy - 4 - morpholinoaniline as the light-sensitive diazonium compound, and 2,2′,4,4′ - tetrahydroxy-3,3′ - dimethyldiphenylsulfide; 2,2′,4,4′-tetrahydroxy-5,5′-dichlorodiphenylsulfide; and 2-hydroxy - 3 - naphthoic acid, 3′-acetylanilide as the coupling components.

22. A diazotype material comprising a support and a diazo layer coated on said support, said layer comprising a light-sensitive diazo composition as claimed in claim 1.

23. A diazotype material as claimed in claim 12, wherein the support is selected from the class consisting of paper, cloth, transparentized paper, a cellulose ether film a cellulose ester film and a polyester film.

24. A diazotype material comprising a cellulose diacetate film as a support and a diazo layer coated on said support, said layer comprising the light-sensitive diazo composition claimed in claim 10.

25. A diazotype material comprising a cellulose diacetate film as a support and a diazo layer coated on said support, said layer comprising the light-sensitive diazo composition claimed in claim 11.

26. A diazotype material comprising a cellulose diacetate film as a support and a diazo layer coated on said layer comprising the light-sensitive diazo composition claimed in claim 12.

27. A diazotype material comprising a cellulose diacetate film as a support and a diazo layer coated on said support, said layer comprising the light-sensitive diazo composition claimed in claim 13.

28. A diazotype material comprising a cellulose diacetate film as a support and a diazo layer coated on said support, said layer comprising the light-sensitive diazo composition claimed in claim 14.

29. A diazotype material comprising a cellulose diacetate film as a support and a diazo layer coated on said support, said layer comprising the light-sensitive diazo composition claimed in claim 15.

30. A diazotype material comprising a cellulose diacetate film as a support and a diazo layer coated on said support, said layer comprising the light-sensitive diazo composition claimed in claim 16.

31. A diazotype material comprising a cellulose diacetate film as a support and a diazo layer coated on said support, said layer comprising the light-sensitive diazo composition claimed in claim 17.

32. A diazotype material comprising a cellulose diacetate film as a support and a diazo layer coated on said support, said layer comprising the light-sensitive diazo composition claimed in claim 18.

33. A diazotype material comprising a cellulose diacetate film as a support and a diazo layer coated on said support, said layer comprising the light-sensitive diazo composition claimed in claim 19.

34. A diazotype material comprising a cellulose diacetate film as a support and a diazo layer coated on said support, said layer comprising the light-sensitive diazo composition claimed in claim 20.

35. A diazotype material comprising a cellulose diacetate film as a support and a diazo layer coated on said support, said layer comprising the light-sensitive diazo composition claimed in claim 21.

References Cited

UNITED STATES PATENTS

| | | | |
|---|---|---|---|
| 3,493,377 | 2/1970 | Rauhut et al. | 96—91 |
| 2,542,560 | 2/1951 | Neumann | 96—91X |
| 2,617,726 | 11/1952 | Kessels | 96—91X |
| 2,717,832 | 9/1955 | Sulich | 96—91 |
| 2,893,866 | 7/1959 | Haefeli | 96—91X |
| 3,052,542 | 9/1962 | Sulich | 96—91X |
| 3,069,268 | 12/1962 | Herrick | 96—75X |
| 3,113,025 | 12/1963 | Bialczak | 96—49 |
| 3,248,220 | 4/1966 | Van Rhijn | 96—91 |
| 3,373,021 | 3/1968 | Adams | 96—75X |
| 3,410,688 | 11/1968 | Welch | 96—91 |

FOREIGN PATENTS

| | | | |
|---|---|---|---|
| 937,510 | 9/1963 | Great Britain | 96—91 |

OTHER REFERENCES

Nollev, C. R., "Textbook of Organic Chemistry," 2nd ed., 1958, p. 341.

NORMAN G. TORCHIN, Primary Examiner

C. L. BOWERS, Jr., Assistant Examiner

U.S. Cl. X.R.

96—91.49; 260—203, 560